July 22, 1958 R. W. TRIPP ET AL 2,844,802
ROTARY POSITION MEASURING TRANSFORMER
Filed Jan. 28, 1957 6 Sheets-Sheet 1

ROBERT W. TRIPP &
JAMES L. WINGET,
INVENTORS.

BY *W E Beatty*

ATTORNEY.

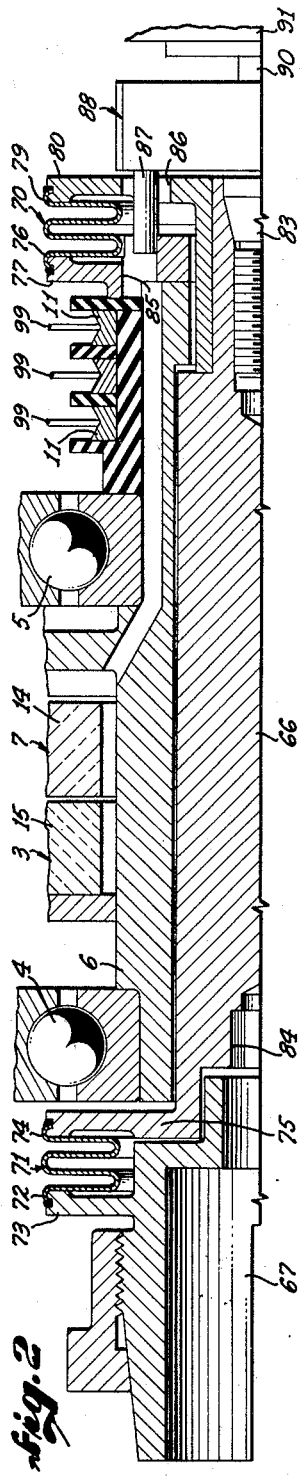

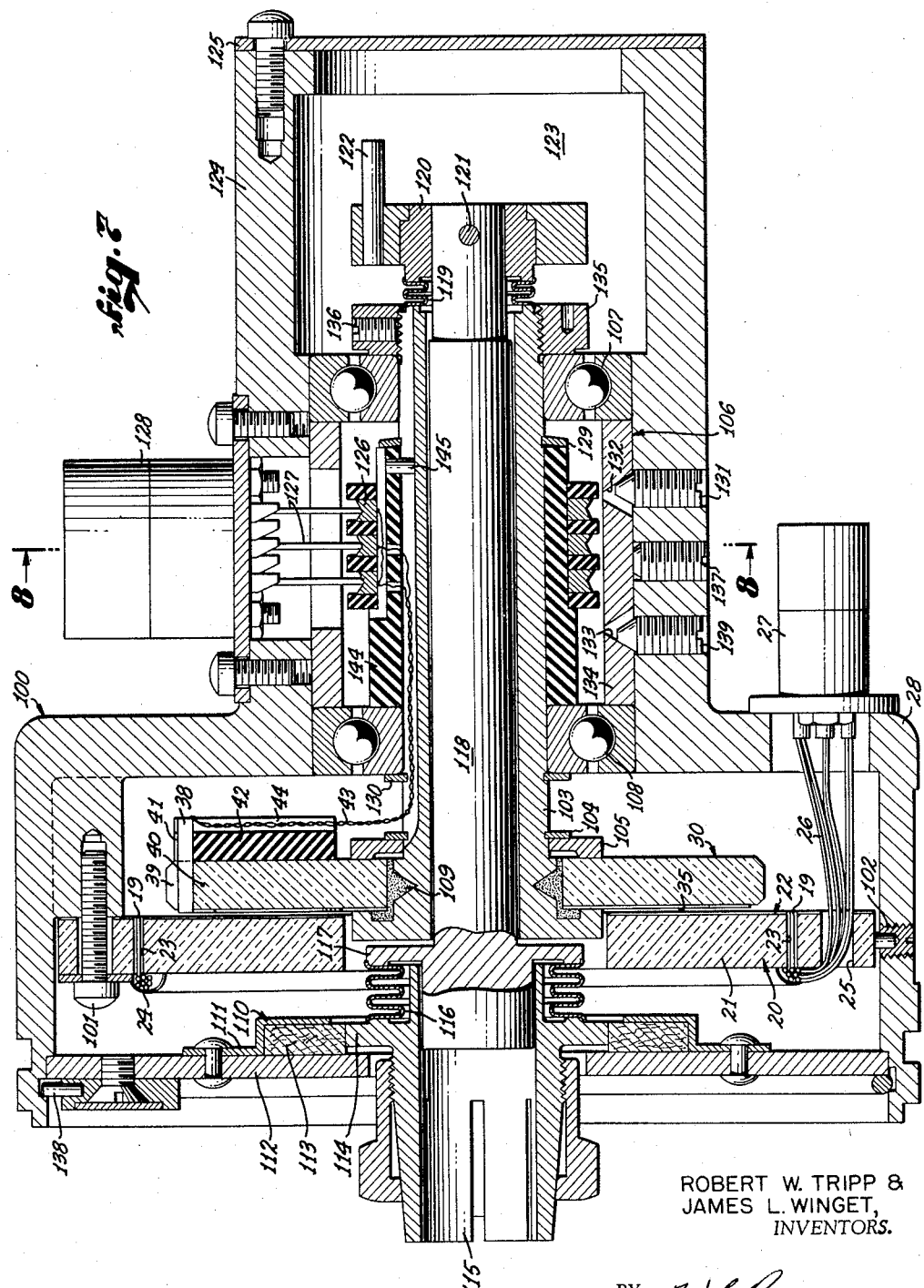

July 22, 1958 R. W. TRIPP ET AL 2,844,802
ROTARY POSITION MEASURING TRANSFORMER
Filed Jan. 28, 1957 6 Sheets-Sheet 4
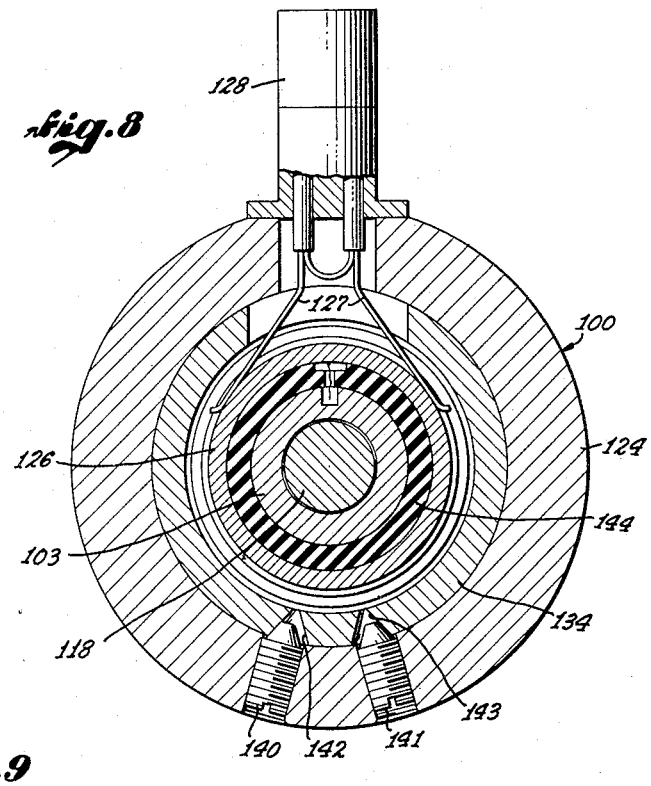
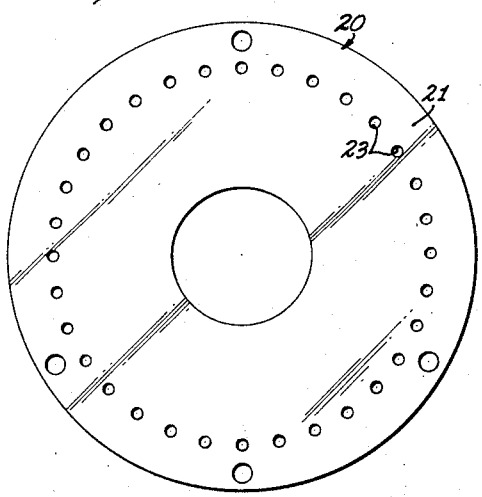
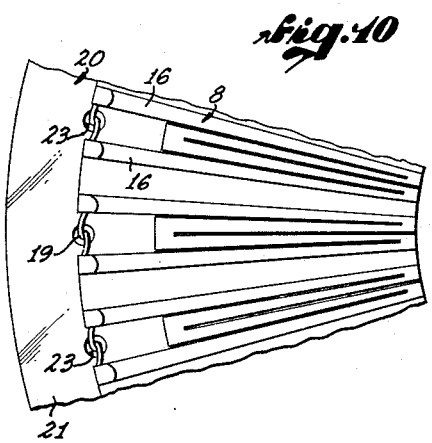
ROBERT W. TRIPP &
JAMES L. WINGET,
INVENTORS.
BY W. E. Beatty
ATTORNEY.

July 22, 1958 R. W. TRIPP ET AL 2,844,802
ROTARY POSITION MEASURING TRANSFORMER
Filed Jan. 28, 1957 6 Sheets-Sheet 5

ROBERT W. TRIPP &
JAMES L. WINGET,
INVENTORS.

BY *W E Beatty*

ATTORNEY.

July 22, 1958  R. W. TRIPP ET AL  2,844,802
ROTARY POSITION MEASURING TRANSFORMER Filed Jan. 28, 1957  6 Sheets-Sheet 6

ROBERT W. TRIPP &
JAMES L. WINGET,
INVENTORS.

BY W. E. Beatty

ATTORNEY.

United States Patent Office 2,844,802
Patented July 22, 1958

2,844,802

ROTARY POSITION MEASURING TRANSFORMER

Robert W. Tripp, Bronxville, and James L. Winget, Harrison, N. Y., assignors to Inductosyn Corporation, Carson City, Nev., a corporation of Nevada Application January 28, 1957, Serial No. 636,623

7 Claims. (Cl. 336—123)

This invention relates to position measuring transformers which are used to establish positions of rotary shafts to an accuracy of a few seconds of arc.

One preferred form, known as the Inductosyn,[1] utilizes the magnetic field produced by a series of hairpin-like conductors, arranged in alternate north and south poles. In such a case, the primary consists of two windings on an insulating support and spaced thereon one-quarter cycle with respect to each other, and the secondary is a single winding on an insulating support. The primary and secondary windings have an air core and are mounted for relative movement parallel to each other and in close space relation to each other. This rotary transformer is of the form described in co-pending application, Serial No. 509,168, filed May 18, 1955 and now Patent No. 2,799,835, by R. W. Tripp and J. L. Winget, where the conductors have been arranged and proportioned to achieve a uniformity of magnetic coupling between primary and secondary windings, which is truly sinusoidal with respect to displacement.

For further details of the invention reference may be made to the drawings wherein Fig. 1 is a sectional view through a rotary position measuring transformer of one form embodying the invention.

Fig. 2 is an enlarged sectional view corresponding to Fig. 1, with parts broken away.

Figs. 3 and 4 are perspective views of the stator and rotor respectively, of Fig. 1.

Fig. 5 is a perspective view of a coupling member.

Fig. 6 is a sectional view through the rotor and its support of the form shown in Fig. 1, the section being on a different plane than that of Fig. 1.

Fig. 7 is a sectional view of a preferred form of the invention.

Fig. 8 is a sectional view on line 8—8 of Fig. 7.

Fig. 10 is an enlarged view of a portion of the front of the stator in Fig. 9, the latter being a plan view.

Fig. 11 is a perspective view of one of the conductor groups on the stator of Fig. 10.

Figure 1:
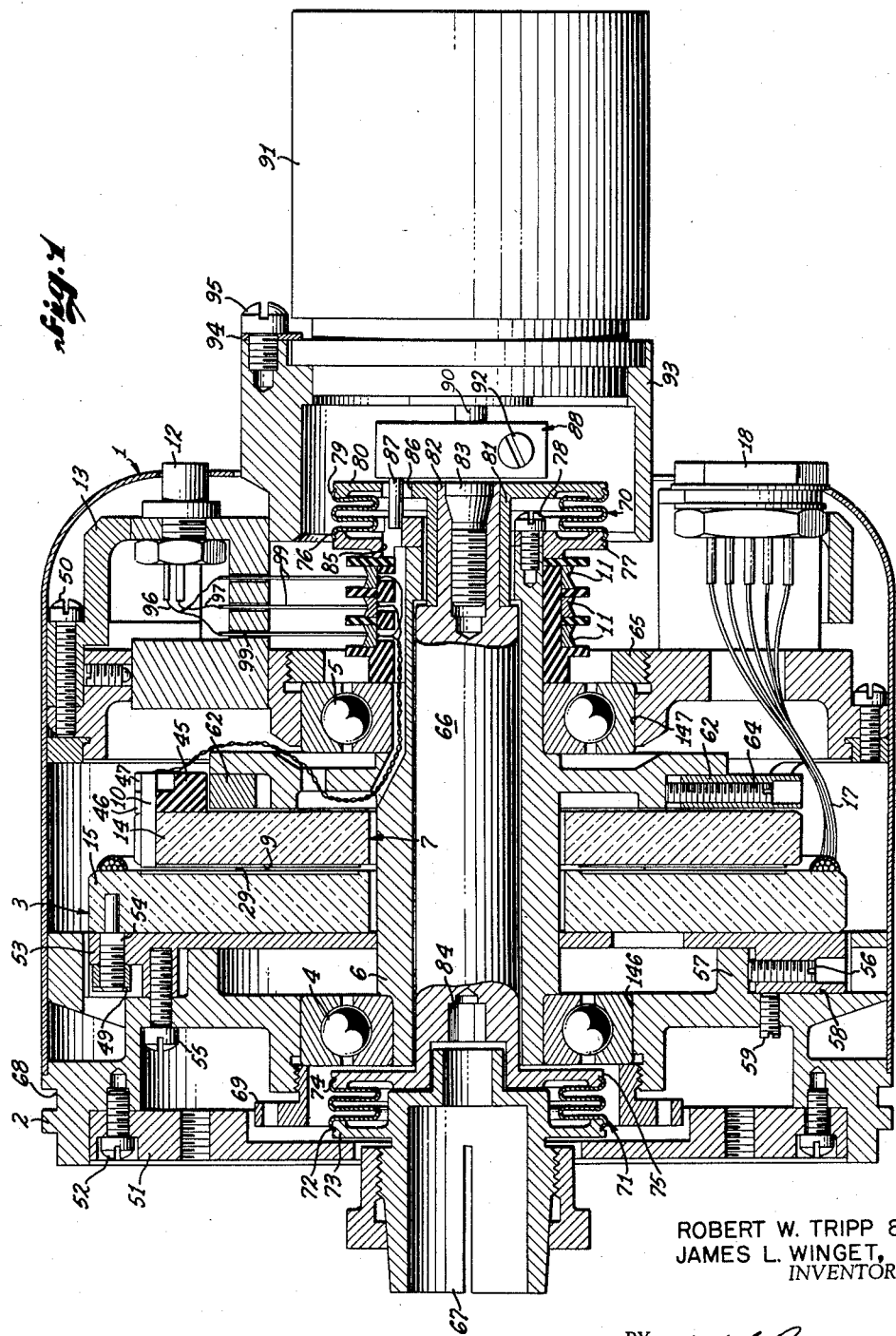

Referring in detail to the drawings, the rotary position measuring transformer 1 in Fig. 1 includes a casing 2 in which is adjustably supported a stator 3. The casing has bearings 4 and 5 which rotatably support a hollow shaft 6 which adjustably carries a rotor 7. The inner face of rotor 7 has a single conductor winding indicated at 9, like a winding 35 in Fig. 13 for the form of transformer shown in Fig. 7. This rotor winding 9 has terminals indicated at 10 which are brought out to the

Figure 12:
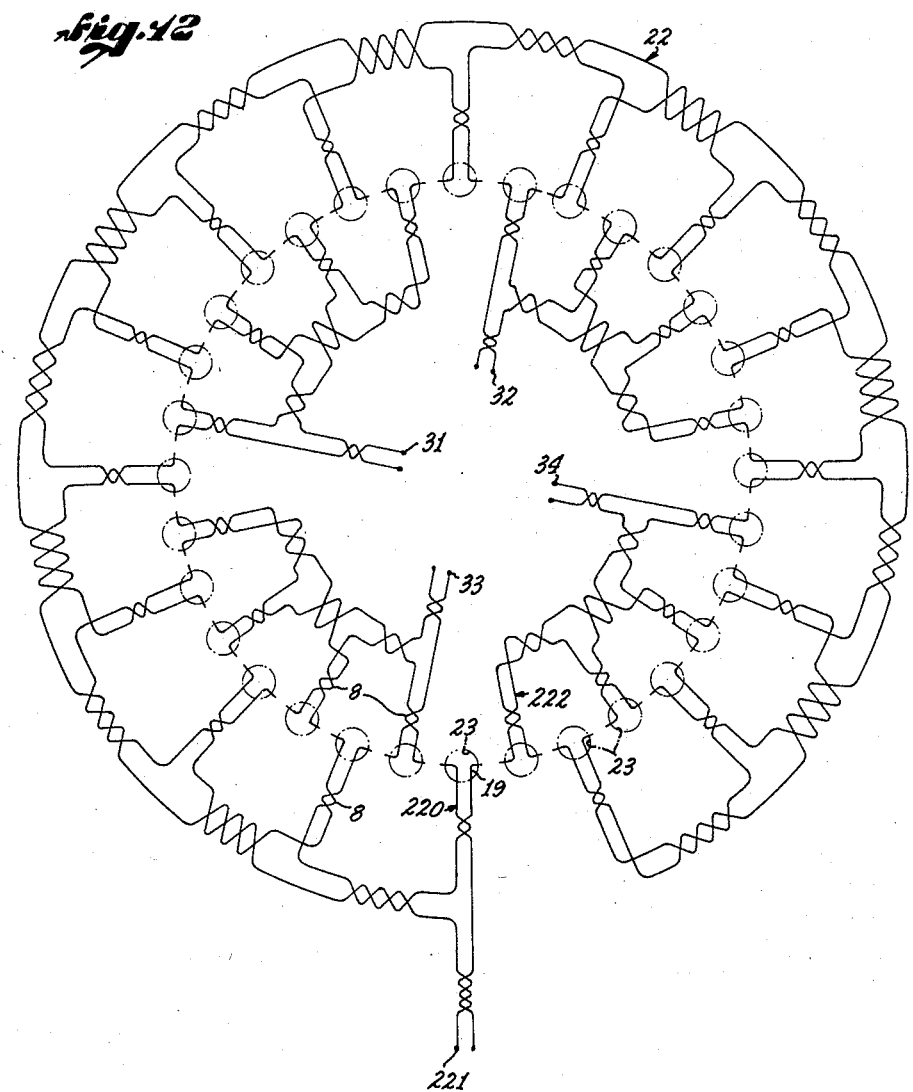
Fig. 12 is a wiring diagram of a 32 section, 144 pole stator winding which may be used for both of the forms shown in Figs. 1 and 7.

[1] Registered trademark.

slip rings 11 in Fig. 1 which are connected to the connector 12 suitably mounted on the end plate 13 of the casing 2. The terminals 10 and their lead-in connections are similar to the terminals 37, 38 and their connections 43 shown in Fig. 14 and described in connection with the rotor 30 of the embodiment shown in Fig. 7. Three slip rings are used as indicated at 11 in Fig. 1, the two outside rings being tied together as shown at 96 to form one side of the circuit while the center ring forms the other side 97 of the circuit. This is done to partially compensate for stray inductive coupling between the stator 3 and the leads to the slip rings 11 and brushes 99. The winding 9 is an electro deposit on an insulating support shown as a glass disk 14 in Fig. 1. This rotor winding is like that shown in Fig. 13. Stator winding 29 is an electro deposit on a similar glass disk 15 which forms the stator, similar to the stator shown in Figs. 9 and 10 for the Fig. 7. The stator winding is shown in Fig. 12 as consisting of 32 sections, each section being like section 8 in Fig. 11, and having 144 poles, as there is one pole per radial conductor like 16, although other values may be used. The conductor groups like group 8 of four conductors as shown in Fig. 11 are connected to form two windings in space quadrature as shown in or similar to the two windings in Fig. 12 for the embodiment in Fig. 7, the stator winding for the stator 3 in Fig. 1 being indicated at 29.

The primary or stator and secondary or rotor windings are fundamentally the same in both Figs. 1 and 7, however, with some structural differences in the manner in which the leads are taken out. In the case of Fig. 1, the stator leads 17 are taken from the front of the glass support, being taken to a connector 18 mounted on the end plate 13 of casing 2. In Fig. 7, the stator 20 consists of a similar glass disk 21 having a winding 22 shown in detail in Fig. 12. The leads 19 for each conductor group indicated at 8 are taken through a hole like 23 through the glass support to its left hand side where all of the leads for each space quadrature winding are connected together to form the two space quadrature windings, of which one winding 220 has terminals 221 and the other winding 222 having the terminals 31 to 34. The leads for all of these terminals of stator winding 22, consisting of windings 220 and 222 are indicated by the cable 24, such leads extending through a hole like 25 in glass disk 21 to form the lead-in wires 26 connected to the connector 27 mounted on the casing 28.

Figure 13:
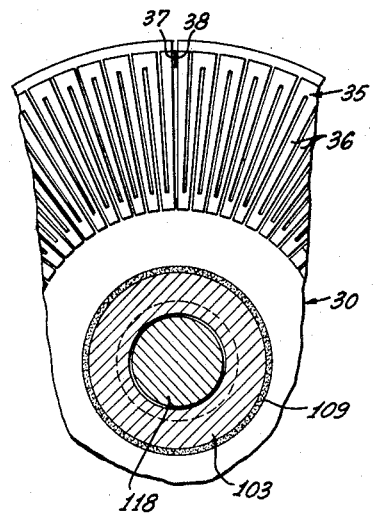
Fig. 13 is a front plan view of the rotor of Fig. 7, with parts broken away.

In both cases, the rotor winding is a single conductor winding as indicated at 35 in Fig. 13, each of the radial conductor portions like 36 being connected in series with all of the other similar radial conductors, each such conductor forming a pole, and the pole spacing for example being about .05 inch. In the case of the rotors and stators for both forms of the invention, the windings may be metallic deposits on their respective supports.

Figure 14:
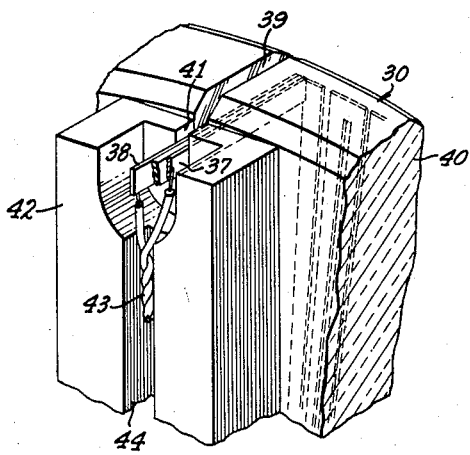
Fig. 14 is an enlarged perspective view of the rear of the rotor of Fig. 13, showing the terminal connections for the single winding on the rotor.

As shown in Fig. 14, the leads for the rotor winding may consist of metal foil strips like 37 and 38 soldered to the ends of the winding 35 and extending through a slot like 39 in the glass disk 40 in the case of rotor 30 of Fig. 7 and through a slot 41 in a supporting block of insulating material 42 cemented to the back of the glass disk 40. The lead-in conductors 43 are soldered to the strips 37 and 38 and extend through a groove 44 in the block 42. In the case of the form shown in Fig. 1, a similar insulating block 45 and its slot 46 and groove 47 are provided for the single conductor winding of the rotor 7.

While the stator 3 in Fig. 3 for the form shown in Fig. 1 shows a different number of holes like 48 for the terminals of the conductor groups in Fig. 11, the purpose of this is simply to illustrate that the invention is not restricted to any particular number of conductor groups and poles such as described in connection with the stator winding 22 of Fig. 12, and that a different number of conductor groups and poles may be used.

Referring to Fig. 1, the end plate 13 is held in position on the main housing by screws like 50, the end plate 51 being similarly held by screws like 52. The intermediate ring 53 is mounted to the stator glass disk 15 by three equally spaced studs like 54, see also Fig. 3, these studs extending in an axial direction and being cemented in the glass and held to the ring 53 by nuts like 49. The ring 53 is held to the casing 2 by axially extending screws like 55.

An adjustment for centering the stator 3 is provided by the radially extending set screws, three in number and equally spaced, like 56. Screws like 56 are threadedly carried by the intermediate ring 53 and at their inner ends engage a cylindrical surface or hub like 57 on the casing 2. The ring 53 is flat and fits the flat surface 58 of the casing. Three equally spaced screws like 59 extend axially and are mounted in the wall of the casing 2 and are adjusted to tilt the stator 3 as desired, to adjust for wobble. Thus the stator 3 is completely adjustable for centering and wobble. Also, the stator 3 is mounted to the intermediate ring 53 which preferably has substantially the same expansion coefficient as the glass 15 rendering it relatively insensitive to temperature variations.

In a similar manner, the rotor 7 has three studs like 60, see Figs. 4 and 6, similar to studs 54 in Fig. 3, each having a lock nut like 61 to hold the glass disk 14 of the rotor to the intermediate ring 62 which in turn is held to the hollow shaft 6 by means of axially extending screws like 63. As shown in Fig. 1, centering of the rotor 7 is provided by three equally spaced radially extending screws like 64. No wobble adjustment is provided for the rotor 7 since the matching surface of the shaft can be very accurately turned before assembly.

Adjustment for spacing between the stator 3 and rotor 7 is obtained by the limiter or ball bearing retainer 69 for the bearing 4 which limits movement of the hollow shaft 6 and its rotor 7 to the left, and the ball bearing retaining ring 65 for the bearing 5 which limits such movement to the right. The casing 2 has a cylindrical bore 146 supporting the angular bearing 4 for sliding movement in an axial direction and the casing 2 has a similar aligned bore 147 for bearing 5. The mounting of the rotor 7 and stator 3 can thus be adjusted relatively to each other and to the axis of rotation of the drive shaft 66 with the required tolerances.

The drive shaft 66 is substantially coaxial with and extends inside of the hollow shaft 6. The drive connection to the shaft 66 through the collet 67 could produce errors if the shaft 66 is not accurately concentric with the turned centering groove 68 on the outer edge of the casing. The groove 68 is engaged by a suitable support on a casing, not shown, for apparatus with which the position measuring transformer 1 is to be associated. Such possible errors are prevented by the double bellows coupling consisting of the rear bellows assembly 70 and the front bellows assembly 71. These bellows are short sections of hollow corrugated tubing of flexible material of Phosphor bronze or the like, the thickness depending on the torque required to drive the rotors to the specified angular tolerances.

The front bellows 71 is connected at its front end 72 to the flange 73 on the collet coupling 67. Bellows 71 is connected at its rear end 74 to the flange 75 on the drive shaft 66.

The rear bellows 70 is fastened at its inner end 76 to a flange 77 which holds the slip rings 11 in place against the ball bearing 5, flange 77 being fixed to the end of the hollow shaft 6 by screw 78. The outer end of bellows 70 as shown at 79 is fixed to a flange 80 having a hollow cylindrical sleeve 81 which fits over the split reduced portion 82 of the shaft 66, being removably held in position by an expansion screw 83. The opposite end of shaft 66 has a noncircular recess 84 to receive a tool to keep shaft 66 from turning while the screws 83 is being turned.

The flange 77 has an opening 85 and the flange 80 has a similar opening 86 to receive the coupling pin 87 on a coupling 88 as shown also in Fig. 5. The coupling 88 has a split opening 89 to receive the shaft 90 of a synchro 91 as indicated in Fig. 1. The coupling 88 is retained on shaft 90 by clamp screw 92. The synchro 91 is removably retained in a socket 93 on the casing 2 by means of the clamp 94 and screw 95, similar means if desired being employed to support the opposite end of casing 2 on its associated apparatus or support not shown.

The bellows couplings 70, 71 will allow for misalignments of up to .005 inch and angular misalignments of up to 5 minutes of arc and still not introduce angular errors of greater than 1 second of arc between the angle of the input shaft and the resulting angle of the rotor 7 of the transformer 1.

The end plate 51 acts as a retainer for the bellows assembly preventing accidental damage to the flexible bellows 70, 71. The synchro or resolver 91 can be mounted as shown to serve as a one speed data element when required. When this unit is not required it is replaced by a cover plate not shown.

Figs. 7 to 11 show the simplified form of position measuring transformer indicated generally at 100. In this form, many of the adjustments have been eliminated to reduce the cost of manufacture. For example, the stator plate or disk 21 is mounted by the screws like 101 directly on the main casing housing 28. The stator 20 is centered by three equally spaced radial screws like 102 which are then withdrawn after the screws 101 are clamped with the stator 20 in proper position.

The rotor 30 is mounted to the hollow shaft 103 temporarily by the bowed clamp ring 104 and pressure disk 105. Ring 104 fits in a groove in shaft 103 as shown and presses against pressure disk 105. Rotor 30 is centered so that the outer peripheral edge of its winding 35 in Fig. 13 is concentric with its ball bearing assembly 106 including the outer and inner ball bearings 107 and 108. The adjustment for concentricity is accomplished by supporting the rotor 30, the hollow shaft 103 and the bearing assembly 106 including bearings 107 and 108 in a fixture which includes means for adjusting the position of rotor 30 relatively to its hollow shaft and bearings. The concentricity is observed with a microscope and when it is within the tolerance, Wood's metal indicated at 109 is poured between the glass disk 40 and the shaft 103 as shown, to support the glass disk 40 in its adjusted position.

Until the transformer 100 is assembled to the device not shown, with which it is to be used, the left hand end of the shaft assembly is held in place by the seal assembly 110. This assembly includes a ring 111 mounted on the inside of the end plate 112 and carrying an inwardly projecting seal 113 of felt or the like which supports the flange 114 on the collet coupling 115. As previously described in connection with Fig. 1, the bellows 116 is connected at its front end to the flange 114 on the coupling 115 and at its inner end to a flange 117 on the drive shaft 118 which is arranged inside of the hollow shaft 103. Also, the rear bellows 119 is fastened at its inner end to the hollow shaft 103 and at its outer end to the coupling 120 which is connected by a pin 121 to the shaft 118. The coupling 120 has a coupling pin 122 for connection to a synchro if desired. The right hand end of the shafts 103 and 118 and the coupling 120 are housed in a recess 123 in the casing extension 124 which is provided with a cover plate 125.

The connections for the rotor 30 are led to the slip rings 126 having brushes 127 leading to the connector 128. Slip rings 126 have an insulating mount 144 fixed to the hollow shaft 103 by a pin 145. The slip rings 126 are held in position by a clamp ring 129 which urges the slip ring mount to the left against bearing 108 and clamp ring 130 on the opposite side of the bearing 108.

The rotor 30 with its bearings 107 and 108 and slip rings 126 as a unit are adjustable in an axial direction by means of the tapered screws 131 and 139 which act on the axially spaced cam holes 132 and 133 respectively of a sleeve 134 which extends between the bearings 107 and 108. Tapered screws 140 and 141, see Fig. 8, engage cam holes 142 and 143 spaced apart around the periphery of the sleeve 134 to hold it in adjusted rotative position. Bearing assembly 106 is cylindrical and slidably carried in the cylindrical casing bore 98. Bearing 107 is urged against sleeve 134 and the latter against bearing 108 and clamp ring 130 by the threaded ring 135 which is locked in position by set screw 136. The bearing assembly 106 including bearings 107, 108 and the sleeve 134 is thus clamped in position on hollow shaft 103, between clamp ring 130 and ring 135. The sleeve 134 is locked in position by set screw 137.

Accuracies of 5 seconds of arc have been obtained with the construction shown in Fig. 7 when care is used to mount its rotor accurately.

Referring to Fig. 7, the end plate 112 is removably held in position by the bayonet lock 138 or the like. Plate 112 is removed when the transformer 100 is assembled to the device with which it is to be used. At this time, the casing 28 is securely attached to the frame of the associated device and the shaft of the associated device is inserted into the collet 115 and clamped. When so mounted, the shaft assembly of the transformer 100 is supported at its left hand end by the shaft and bearing of the associated device. Any slight eccentricity of the shaft of the associated device is accommodated by the bellows 116 and 119.

Various modifications may be made in the invention without departing from the spirit of the following claims.

We claim:

1. A rotary transformer comprising a casing having therein closely spaced stator and rotor disks of insulating material, said stator having a central hole, a transformer winding on each of the adjacent faces of said disks, all of said windings having radial conductors with one conductor per pole, a hollow shaft, means supporting said rotor on said hollow shaft, bearing means on said casing supporting said hollow shaft, a drive shaft in said hollow shaft, said drive shaft extending through said hole in said stator, a drive coupling, a flexible bellows connecting said coupling and one end of said drive shaft, and another bellows connecting the other end of said drive shaft and the corresponding end of said hollow shaft.

2. A rotary transformer according to claim 1, both of said bearings being on the same side of said stator.

3. A rotary transformer according to claim 1, said bearings being at opposite sides of said stator, said rotor having a central hole through which both of said shafts extend.

4. A rotary transformer according to claim 1, said transformer having an air core, one of said windings being a single continuous winding and the other winding comprising windings in space quadrature of the pole cycle of said single windings.

5. A rotary transformer according to claim 1, in combination with means for centering said stator in said casing, means for securing said stator to said casing in centered position, a bearing in said casing for said hollow shaft, said casing supporting said bearing for movement axially of said hollow shaft, and means for adjusting the axial position of said bearing to adjust the spacing between said stator and said rotor.

6. A rotary transformer according to claim 5 and comprising means for locking said bearing in adjusted position.

7. A rotary transformer comprising a casing having therein closely spaced stator and rotor disks of insulating material each having a winding on adjacent faces of said disks, means supporting said stator in centered position in said casing, a hollow shaft, means supporting said rotor in centered position on said hollow shaft, a bearing assembly in said casing supporting said hollow shaft, means for clamping said bearing assembly in position on said shaft, means for adjusting the axial position of said bearing assembly to adjust the spacing of said rotor and stator, a drive shaft in said hollow shaft, a drive coupling, a flexible bellows connecting said drive coupling and the adjacent end of said drive shaft and another bellows connecting the opposite end of said drive shaft and the adjacent end of said hollow shaft.

No references cited.